United States Patent
Zimmermann et al.

(10) Patent No.: US 12,202,619 B2
(45) Date of Patent: Jan. 21, 2025

(54) STRUCTURAL COOLING SYSTEM FOR AN AIRCRAFT

(71) Applicant: Airbus (S.A.S.), Blagnac (FR)

(72) Inventors: Kristian Zimmermann, Ottobrunn (DE); Christian Metzner, Gmund (DE); Uwe Beier, Höhenkirchen-Siegertsbrunn (DE); Jorge A. Carretero Benignos, Garching bei München (DE)

(73) Assignee: Airbus (S.A.S.), Blagnac (FR)

( * ) Notice: Subject to any disclaimer, the term of this patent is extended or adjusted under 35 U.S.C. 154(b) by 78 days.

(21) Appl. No.: 18/196,284

(22) Filed: May 11, 2023

(65) Prior Publication Data

US 2024/0116647 A1 Apr. 11, 2024

(30) Foreign Application Priority Data

May 13, 2022 (EP) .................................. 22173145

(51) Int. Cl.
*B64D 33/10* (2006.01)
*B64D 27/355* (2024.01)

(52) U.S. Cl.
CPC .......... *B64D 33/10* (2013.01); *B64D 27/355* (2024.01)

(58) Field of Classification Search
CPC ................................. B64D 33/08; B64D 33/10
See application file for complete search history.

(56) References Cited

U.S. PATENT DOCUMENTS

| | | | |
|---|---|---|---|
| 11,273,925 B1 * | 3/2022 | O'Mealile | F28D 15/025 |
| 11,876,263 B1 * | 1/2024 | Wang | B64D 33/10 |
| 11,891,953 B2 * | 2/2024 | Sobanski | F02C 7/12 |
| 2008/0149299 A1 | 6/2008 | Slaughter | |
| 2014/0014493 A1 | 1/2014 | Ryan | |
| 2018/0016020 A1 * | 1/2018 | Lerg | B64D 33/04 |
| 2018/0050810 A1 * | 2/2018 | Niergarth | F04D 29/056 |
| 2018/0050811 A1 * | 2/2018 | Niergarth | B64D 27/18 |
| 2018/0187984 A1 | 7/2018 | Manzo | |
| 2020/0039654 A1 | 2/2020 | Smith | |

(Continued)

FOREIGN PATENT DOCUMENTS

EP 3718896 A1 * 10/2020 ............. B64D 13/00

OTHER PUBLICATIONS

European Search Report for Application No. 22173145 dated Oct. 13, 2022.

*Primary Examiner* — Christopher P Ellis
(74) *Attorney, Agent, or Firm* — KDW Firm PLLC

(57) ABSTRACT

A component for an aircraft and an aircraft with such component. The component includes a heat source enclosed by a housing, heat exchanger, heat sink, at least one structural suspension element, and an air duct. Each structural suspension element is attached to an inner surface of the housing and supports one or more of the heat source within the housing. The heat sink is part of the housing and configured to guide air from an inside of the housing an outside of the housing. Each heat exchanger is thermally coupled to the heat source. Each heat exchanger is fluidly connected to the heat sink via an inlet line and a return line for a coolant. The air duct is configured to guide ambient air from the outside through the housing, past each of the at least one structural suspension element, and through the heat sink out of the housing.

15 Claims, 2 Drawing Sheets

(56) References Cited

U.S. PATENT DOCUMENTS

| | | |
|---|---|---|
| 2020/0180771 A1 | 6/2020 | Moore |
| 2020/0303788 A1* | 9/2020 | Rheaume ............ H01M 10/637 |
| 2020/0391876 A1 | 12/2020 | Morrison |
| 2022/0106053 A1* | 4/2022 | Snyder ................ B64D 27/026 |
| 2022/0281613 A1* | 9/2022 | Senthilnathan ........ B64D 27/24 |

* cited by examiner

STRUCTURAL COOLING SYSTEM FOR AN AIRCRAFT

TECHNICAL FIELD

The present disclosure relates to components with integrated lightweight cooling systems, in particular for aircraft applications.

BACKGROUND

Today, a substantial number of heat exchangers are used in aircraft. Their size and weight is relatively small compared to the overall vehicle because the needed active heat transfer area is relatively small, driven by high temperatures differences or high accepted pressure losses. In classic turbine aircrafts, the system with the highest thermal energy are the fuel burn turbines. Such turbines are an open system, in which the hot exhaust gases do not need to be cooled. The turbines only need inner cooling, which is ensured by utilizing heat exchangers and/or film cooling in the high temperature/high pressure system, using compressed air.

In view of environmental protection efforts, alternative propulsion systems for aircraft applications are increasingly developed, and such systems may, for example, utilize hydrogen fuel cells as energy source for electric motors. The fuel cells provide electrical energy to the electrical motor that provides thrust via a propeller. The electrical energy is generated by an electrochemical process where hydrogen and oxygen react, thereby producing water, electricity, and heat. The maximum efficiency of this electrochemical process is currently limited to approximately 60% (electricity), whereas approximately 40% of the overall energy is dissipated in heat. Therefore, the fuel cells must be cooled down, to prevent overheating and efficiency reduction.

For primary propulsion purposes the necessary power is in the order of megawatts, which means that the heat rejected to the atmosphere will also be in the megawatt range. In case of low temperature fuel cells such as PEM's (proton exchange membrane), where the operation temperature is in the vicinity of 100° C., due to the necessary high cooling power (MW range) and low differential temperature (down to some 10 K—as minimum approach temperature), the cooling system therefore becomes massive, resulting in weight and drag issues.

SUMMARY

It is an objective to provide a cooling system for aircraft components having reduced weight. This objective is solved by the subject matter disclosed herein. Further embodiments are described in the following description.

According to a first aspect, a component for an aircraft is provided. The component comprises at least one heat source, a housing enclosing the at least one heat source, at least one heat exchanger at least one heat sink, at least one structural suspension element, and an air duct.

Each of the at least one structural suspension element is attached to an inner surface of the housing and supports one or more of the at least one heat source within the housing. The heat sink is part of the housing and is configured to guide air from an inside of the housing to an outside of the housing to thereby convey thermal energy from the heat sink to the surroundings. Each of the at least one heat exchanger is thermally coupled to at least one of the at least one heat source (preferably, each heat exchanger is thermally coupled or assigned to a single heat source, which may include that multiple heat exchangers are thermally coupled to that single heat source; alternatively, a heat exchanger is thermally coupled to two or more adjacent heat sources, which may include that multiple heat exchangers are arranged so each heat exchanger is thermally coupled to two or more heat sources). Each of the at least one heat exchanger is fluidly connected to one of the at least one heat sink via an inlet line for a coolant (for example, a liquid coolant) flowing along one of the at least one structural suspension element. Each of the at least one heat sink is fluidly connected to at least one of the at least one heat exchanger via a return line for the coolant flowing along one of the at least one structural suspension element. The air duct is configured to guide ambient air from the outside of the housing through the housing, past each of the at least one structural suspension element, and through the at least one heat sink out of the housing, thereby enabling a cooling of the coolant flowing through each of the inlet paths and the return paths and through each of the at least one heat sink.

Modern aircrafts use a large number of devices that may need to be cooled in order not to be damaged or adversely affected. For example, an engine may employ certain components, such as electric motors or other components dissipating heat. However, other structures, such as, for example, a control surface, may also use certain actuators or other electrical devices generating heat, that may need to be cooled. The component described herein incorporates a cooling functionality for such components that adds less weight to the overall component, therefore facilitating compliance with weight requirements. In particular, this is achieved by merging several system functionalities of regular cooling systems, such as ducting, coolant piping, heat exchangers, and the housing of the component itself. In particular, part of the housing itself may act as a heat sink, as will be described below.

The heat sources may each be any device other structure that produces heat and that needs to be cooled. For example, the heat source may be an electric motor, a battery, a fuel cell or any other structure or device that produces heat. Such components may, for example, be used in a hydrogen powered aircraft engine. Further, if more than one heat source is present within the component, different heat sources may be of a different kind. So, for example, some of the heat sources may be electric motors, some of the heat sources may be fuel cell, some of the heat sources may be other electrical devices (such as actuators), as well as any possible combination of these variants. Fuel cells in particular produce a large amount of heat, apart from the needed electrical energy, that needs to be transported away in order for the fuel cell to work efficiently and not to overhead. It should be appreciated that the aforementioned heat sources are only exemplary in nature and the heat sources may also be any other heat source that needs to be cooled.

Each of the heat sources is placed within the housing. The housing may, for example, be the nacelle of an aircraft engine, in particular of a hydrogen or other electrically powered aircraft engine. However, the housing may in general be the housing of any component that includes a heat dissipating element, such as, for example, a wing or other control surface of an aircraft, that includes certain heat dissipating actuators or other devices. The housing encloses or surrounds the heat source, such that the heat source is arranged within the housing.

The structural suspension elements may, for example, be support struts which are projecting inward the housing and which are connected to an inner wall of the housing as well as to the heat source, such that the heat source is supported and held in place by the structural suspension elements. In other words, the structural suspension elements connect the heat source with an inner wall or other inner element of the housing and fixes (or at least participates in fixing) the heat source in place. For example, when the component is an aircraft engine, the structural suspension elements may be stiffening struts of other reinforcement elements which increase structural integrity of the housing itself and which hold the heat source within the housing.

Each of the at least one heat exchanger is thermally coupled to at least one of the heat sources. This means, the corresponding heat exchanger is arranged to convey thermal energy away from the at least one heat source. Each heat source may have a dedicated heat exchanger of some heat sources may share a common heat exchanger. The respective heat exchanger may be in direct contact with the respective heat sources. However, it is also conceivable that the heat exchanger is not in direct contact, i.e., does not directly abut the heat sources, but is arranged in the vicinity of the corresponding heat sources, such that the thermal energy from the heat sources may be coupled into the heat exchanger by way of the thermal radiation. However, any thermal coupling is conceivable. The heat exchangers itself may be any regular heat exchangers, which are known in the art.

The heat sink or heat sinks is/are part of the housing itself. For example, the housing may in general have a surrounding wall, parts of which are replaced by corresponding heat sink structures, so that the corresponding part of the wall is configured to receive and conduct a coolant, like a liquid coolant. When the coolant passes the corresponding structure, it may be cooled by air passing by or through the heat sink from the inside of the housing to the surrounding. During this process, the passing air conveys the thermal energy from the heat sink to the surroundings of the housing and therefore of the component. For this, the heat sink may have a geometrical structure having a large overall surface. Further, the intended air leakage through the heat exchangers slows down the air speed within the air duct to a required level for a final heat exchanger state (described further below), thereby leading to less geometrical restrictions and size. This in particular enables to build a shorter housing.

Each of the heat exchangers is connected to at least one of the heat sinks by an inlet line. This inlet line fluidly connects the respective heat exchanger with the respective heat sink, so that the coolant can be transported from the heat exchanger to the heat sink. The corresponding inlet line runs along one of the at least one structural suspension element. The inlet line may, for example, be a regular tube or pipe running along the outside of the structural suspension element. However, the inlet line may also be integrated in the corresponding structural suspension element. For example, the structural suspension element may also be hollow and directly merge into the heat sink, such that the coolant may flow directly within the structural suspension element into the heat sink. Further, instead of the coolant flowing directly within such a cavity of the structural suspension element, a regular tube or pipe may be running along the structural suspension element within the inner cavity.

Analogously to the inlet lines, each of the return lines connects a respective heat sink with at least one heat exchanger via one of the structural suspension elements. Preferably, a return line for one of the heat exchangers runs along a structural suspension element which is different from the structural suspension element along which the inlet line for this particular heat exchanger runs. The coolant runs from the heat sink through the return line back into the heat exchanger.

The air duct is built by the space between the inner wall of the housing and the heat source(s), so that the structural suspension elements together with the inlet and return lines pass through the air duct. Air can pass into the housing through an opening of the housing, which may, for example, as described further below, include a fan for controlling the flow of air into the air duct and therefore the pressure within the air duct. Additionally, flaps or other mechanically adjustable structures may be placed within the opening in order to control the flow of air into the air duct. Since the structural suspension elements together with the inlet and return lines for the coolant pass through the air duct, the air duct itself acts as a heat exchanger. In particular, air flowing through the air duct gets heated by the coolant flowing through the inlet and return lines, thereby conveying the thermal energy dissipated from the inlet and return lines. Further, air flowing out of the housing through the heat sink absorbs heat from the heat sink, thereby further cooling the coolant, which in turn cools the heat sources.

By combining the housing with the heat sink and combining the structural suspension elements with inlet lines and return lines for the heat exchangers arranged at the heat sources, the air duct itself together with these components builds a heat exchanger with a large heat dissipation surface, thereby facilitating enough cooling power while reducing weight compared to regular cooling system.

According to an embodiment, the at least one heat source is a fuel cell or an electric motor or an arrangement of one or more electric motors and one or more fuel cells.

In particular, for example, when the component is an aircraft engine, one or more electric motors may be placed together with one or more fuel cells along a common longitudinal axis and each of the electric motors/fuel cells may have a heat exchanger that is connected to one or more heat sinks within the housing (as described above) by a corresponding inlet line and return line within or along corresponding structural suspension elements, such as reinforcement struts. However, the electric motors and the fuels cells (if more than one such device is present) do not need to be placed in line, but rather may be arranged in any suitable position.

According to another embodiment, the component further comprises a fan. The fan is arranged in an opening of the housing. The fan is configured to control air flow from the outside of the housing into the air duct.

For example, if the component is a propeller aircraft engine, the fan may be arranged coaxially with the propeller on the driveshaft of the propeller at a front end of the engine. A gear set may further be arranged between the fan and the drive shaft, such that the rotational speed and the direction of rotation of the fan may be adjusted independently of the rotational speed and direction of the propeller. This allows to control the air intake into the air duct (and therefore the pressure inside the air duct). On the one hand, during a takeoff procedure on the runway, for example, the speed of the aircraft and therefore the relative air speed with regard to the aircraft is low. Further, in this situation, the engine runs under high load, producing an increased amount of heat. In order to account for this, the fan may be controlled to blow additional air into the air duct, to provide enough cooling power. On the other hand, when the aircraft is travelling at high altitude at cruise speed, the engine may run at a lower, constant output. Also, because of the higher speed, the relative air speed is higher. In this situation, the fan may be used to decelerate the intake air speed (e.g., to approximately 0.1 Mach).

If the component is not an engine, similar fan setups may be utilized to control air flow into the air duct accordingly.

According to another embodiment, the fan is configured to be controlled to control an air flow into the housing such that a pressure difference between the inside of the housing and the outside of the housing is established that supports removal of the air from the inside of the housing through the heat sink utilizing the venturi effect.

By adjusting the air intake utilizing the fan, the internal pressure inside the air duct can be adjusted. Therefore, the pressure difference between the air duct and the surroundings of the component, e.g., an aircraft engine, can be adjusted. Since the heat sink is part of the housing and has a structure that allow for air to pass through the heat sink, by appropriately adjusting the pressure within the air duct, the venturi effect may be utilized to control the air flow through the heat sink, as will be readily apparent.

According to another embodiment, the heat sink comprises a functional cellular geometry.

Such a function cellular geometry in general comprises a cell geometry that is configured to balance the desired mechanical properties, such as mechanical strength with the desired thermal heat transfer properties. The functional cellular geometry in general is at least partially permeably for air and provides enough contact surface for the air passing through the heat exchanger.

According to another embodiment, the functional cellular geometry comprises a gyroid structure.

Such gyroid structures are advantageous with regard to both mechanical stability as well as heat transfer properties. However, other bionic structures are conceivable, too.

According to another embodiment, the housing further comprises at least one suction area and/or at least one blowing area for laminar flow control to avoid flow separation from the outside of the housing.

The air flow from the air duct through the heat sink exits the housing at an outer surface of the component (for example a control surface or an engine). Hence, the exiting air flow through the heat sink at the outer boundary layer of the housing influences the flow of the ambient air. In order to avoid in-flight flow separation and to ensure laminar flow at the boundary layer, suction and blowing areas may be employed, to blow air into or suck air out of the boundary layer at appropriate locations of the housing. This principle is in general known, e.g., for aircraft wings.

According to another embodiment, the component is a control surface of an aircraft.

Such a control surface may be any surface which is configured to control the spatial orientation of the aircraft, e.g., to control the pitch, roll, and yaw angles. Usually, controls surfaces employ actuators or other mechanical displacement devices, in order to move parts of the corresponding surface. These actuator devices produce heat and may need to be cooled. Appropriate cooling may be achieved by the principles described above.

According to another embodiment, the control surface of the aircraft is one of an elevator, a rudder and a wing.

According to another embodiment, the component is an aircraft engine and the housing is a nacelle of the aircraft engine.

According to another embodiment, the aircraft engine is an electric propeller engine comprising an electric motor, at least one hydrogen fuel cell, and at least one hydrogen tank. The electric motor is powered by the at least one fuel cell. The electric motor and/or the at least one fuel cell each are one of the at least one heat source.

The electric motor and the fuel cells may be arranged in line along the longitudinal axis of the engine and may each be supported by corresponding structural suspension elements, as described above.

According to another embodiment, the air duct runs from a front end of the nacelle to a rear end of the nacelle.

Aircraft engines are mounted along a longitudinal direction of the aircraft. The front end of the nacelle corresponds to the front of the engine in the flight direction. The rear end is opposite the front end in the longitudinal direction and is directed towards the aft of the aircraft. In the center of the nacelle, around the longitudinal axis, multiple heat sources such as fuel cells or electric motors may be arranged. The heat sources may be supported within the center of the nacelle by the structural suspension elements, as described above. The air duct therefore circularly surrounds the heat sources and runs along the longitudinal direction of the engine, thereby building a shell-shaped duct.

Optionally, at the front end of the nacelle, a fan, such as described above, may be arranged coaxially around the longitudinal center axis and may be placed within an opening of the nacelle. This allow for the fan to be used to control the air flow from the front end of the engine into the air duct. At the rear end, the nacelle may be closed by a final heat exchanger stage.

According to another embodiment, the housing further includes a final heat exchanger stage at the rear end.

Such a final heat exchanger stage may be a regular heat exchanger that is partially permeable for air. Such a heat exchanger may, for example, be circularly shaped to close the shell-shaped air duct at the rear end of the nacelle. Air that has not already exited the air duct through the heat sink can exit the air duct through the final heat exchanger stage. The coolant from the heat sink may be directed through the final heat exchanger stage, in order to further extract heat from the coolant before the coolant is routed back to the heat exchangers that are thermally coupled to the heat sources, as described above.

According to another embodiment, the heat sink further is configured for de-icing of the housing.

When the air from the air duct (or at least part of the air, if a final heat exchanger stage is used) is routed past the inlet and return lines and exits the housing through the heat sink, the air is heated. Therefore, on the one hand, the heat sink itself, and on the other hand, the heated air exiting the component, may be utilize for de-icing of the surface of the component. When the component is an aircraft engine that is mounted below a wing of an aircraft, the hot air may further be utilized for de-icing of the wing, as will be readily apparent.

According to a second aspect, an aircraft is provided. The aircraft comprises a fuselage and at least one component according to any one of the preceding claims.

The component may be designed according to any one of the embodiments described above. In particular, the component may be an engine or any control surface of the aircraft, as described above.

In summary, the present disclosure provides an aircraft component with integrated cooling capabilities for thermal loads such as fuel cells or electric motors, while simultaneously complying with weight requirements. In particular, by integrating one or more heat sinks into the housing of the component utilizing functional cellular geometries, such as gyroid geometries, and by integrating the inlet and return lines into already present structural suspension elements for the heat sources, a large cooling area can be provided without overly increasing the weight of the component.

Although the present disclosure is described with regard to aircraft applications, it should be noted, that the disclosure may be used for any other suitable application, such as for automotive applications, train application, and similar applications where a lightweight cooling system for high thermal loads is desired.

Further, although mainly described with regard to aircraft engines or aircraft control surfaces, it should be appreciated that the described cooling system may be employed with any component of an aircraft where integrated cooling functionality is desirable. For example, the cooling system may also be used in aircraft wings, such that the cooling system is part of a wing airframe or of a front fuselage airframe where components need to be cooled. For that, for example, integrated ducts may be included within the corresponding components (such as running through a wing of the aircraft) according to the principles described herein.

BRIEF DESCRIPTION OF THE DRAWINGS

In the following, example embodiments are described in more detail having regard to the attached figures. The illustrations are schematic and not to scale. Identical reference signs refer to identical or similar elements. The figures show.

DETAILED DESCRIPTION

Figure 1:
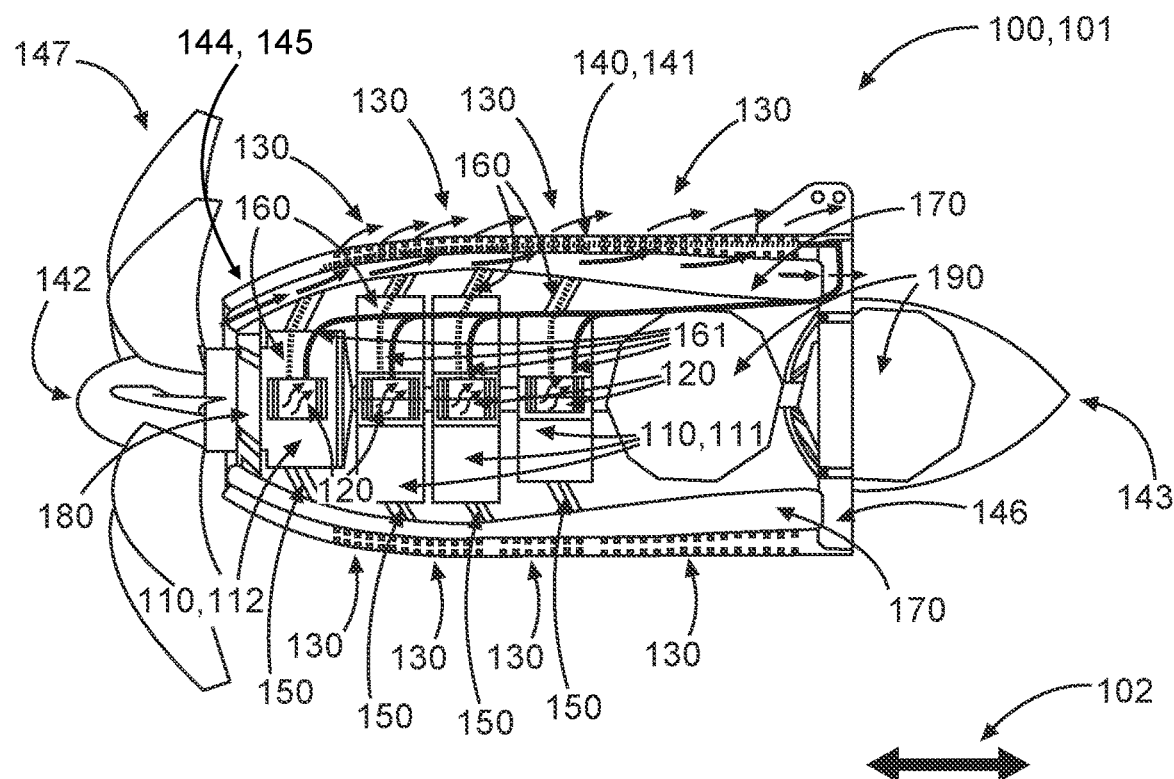
FIG. 1 a schematic cut view of an example aircraft engine having an integrated lightweight cooling system along a longitudinal axis of the engine.
Figure 2:
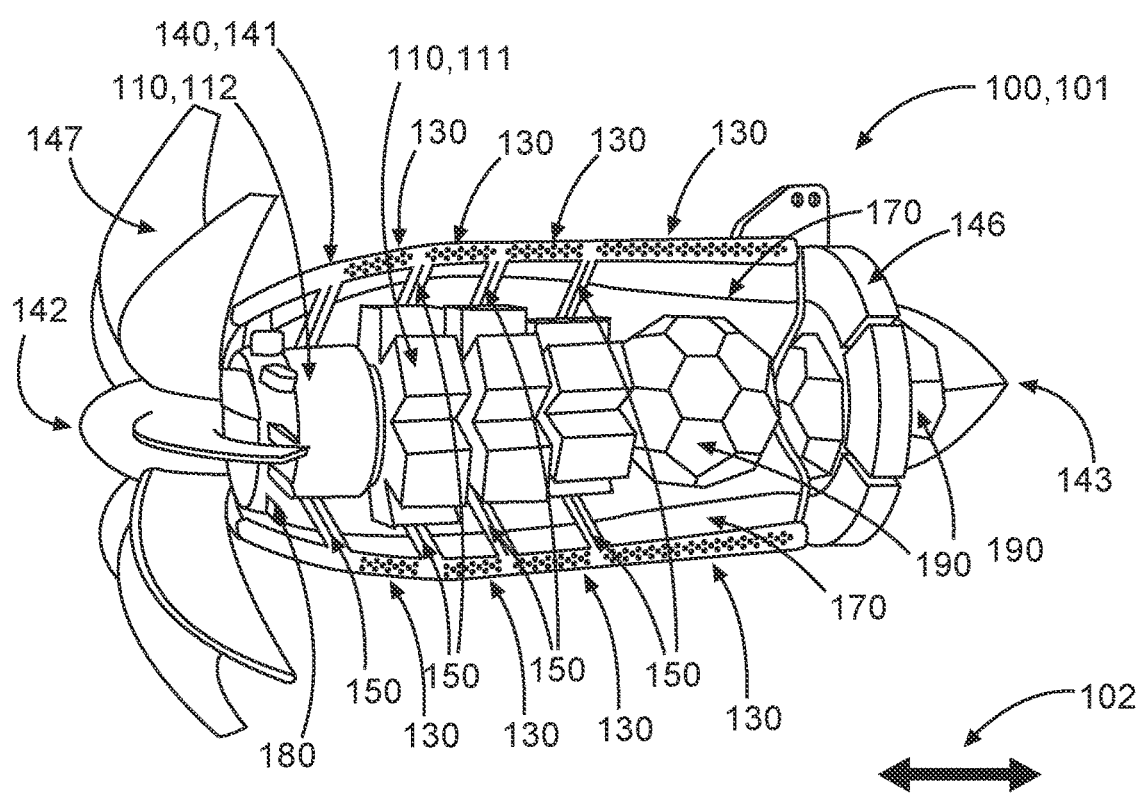
FIG. 2 a schematic isometric partial cut view of the aircraft engine of FIG. 1.

FIGS. 1 and 2 schematically show cut views of a component 100, which is an aircraft engine 101. FIG. 1 shows a schematic cut view of the aircraft engine 101, including the respective flows of air and cooling, which preferably is liquid cooling. However, although liquid cooling is provided herein as an example, it should be understood that the description is not limited to using a liquid coolant. FIG. 2 is a simplified illustration of the aircraft engine 101 of FIG. 1, showing only the structural components of the aircraft engine 101 without any flow paths for air and liquid coolant, but illustrating the three-dimensional structure of the aircraft engine 101. In the following, FIGS. 1 and 2 will be described together.

The illustrated aircraft engine 101 comprises a housing 140 (the nacelle 141) enclosing the inner parts of the engine. The nacelle 141 includes four integrated heat sinks 130. It should be noted that the four heat sinks 130 run around the nacelle 141 in a circumferential direction of the nacelle 141. Each of the heat sinks 130 thereby may be running continuously around the full circumference or may be interrupted by regions without heat sink properties. The aircraft engine 101 further includes a fan 180 at an intake opening at a front end 142. With regard to a longitudinal direction 102 of the aircraft engine 101, the fan 180 is arranged in the intake opening of the nacelle 141 between a propeller 147 and the front end 142 of the nacelle 141.

In the center of the nacelle 141 behind the fan 180, along a common longitudinal axis, are arranged an electric motor 112 as well as three arrangements of fuel cells 111 (which may for example be proton exchange membrane fuel cells (PEM fuel cells)). Each of the three arrangements of fuel cells 111 includes six fuel cells 111, which can best be seen in FIG. 2 (two fuel cells 111 at the opposite side of the drawing plane are not visible). The illustrated aircraft engine 101 further includes two hydrogen tanks 190 for providing the fuel cells 111 with hydrogen. Each of the fuel cells 111 and the electric motor 112 are mounted on a central longitudinal axis of the nacelle 141, which corresponds to the axis of rotation of the propeller 147. Further, each of the fuel cells 111 and the electric motor 112 are connected to the nacelle 141 by structural suspension elements 150.

When in operation, the fuel cells 111 and the electric motor 112 produce heat. Therefore, the fuel cells 111 and the electric motor 112 may be commonly referred to herein as heat sources 110.

A typical heat exchanger 120 is arranged in the center of each of the arrangements of fuel cells 111 and of the electric motor 112. However, these heat exchangers 120 may be arranged at any possible location that allow for a thermal coupling to the corresponding heat sources 110. Further, each of the fuel cell may include a separate heat exchangers 120. Inlet lines 160 and return lines 161 fluidly connect each of the heat exchangers 120 with a corresponding heat sink 130. The inlet lines 160 allow hot liquid coolant from the heat exchangers 120 to flow into the heat sinks 130. The return lines lead back the cooled liquid coolant from the heat sinks 130 into the heat exchangers 120. In the illustrated configuration, the inlet lines 160 and the return lines 161 each run inside a structural suspension element 150. Thereby, in the illustrated configuration, the return lines 161 run through different structural suspension elements 150 than the inlet lines 160, in order to avoid for the cooled liquid coolant in the return lines 161 from being heated by the hot liquid coolant in the inlet lines 160 before returning into the heat exchangers 120. In FIGS. 1 and 2, only one plane of structural suspension elements 150 is shown. However, it should be appreciated that in general, each of the fuel cells 111 may be connected to corresponding heat exchangers 120 by a structural suspension element 150. Further, the liquid coolant may be directed through only some of the heat sinks 130 or through all of the heat sinks 130 in line before returning to the heat exchangers 120 via the return lines 161.

The space between the inner wall of the nacelle 141 and the heat sources 110 and the hydrogen tanks 190 acts as an air duct 170 that circumferentially encloses the heat sources 110. Further, in FIGS. 1 and 2, the aircraft engine 101 includes a final heat exchanger stage 146 at the rear end 143 of the nacelle 141, which closes the back of the nacelle 141 (or rather of the air duct 170) and which is at least partially permeable for air. This final heat exchanger stage may be any regular heat exchanger.

The structural suspension elements 150 may, for example, be stiffening struts, which structurally reinforce the nacelle 141 while simultaneously providing support for the fuel cells 111 and the electric motor 112. Since the air duct 170 encloses the heat sources 110 and runs form the front end 162 to the rear end 143, and since the structural suspension elements 150 (including the inlet lines 160 and return lines 161) run in a substantially radial direction between the heat exchangers 120 and the heat sinks 130 (integrated into the wall of the nacelle 141), air passing through the air duct 170 from the front end 142 to the rear end 143 flows around the structural suspension elements 150. Thereby, heat from the inlet lines 160 and return lines 161 (running through the structural suspension elements 150) is transferred to the air.

The air afterward passes through the heat sinks 130 integrated into the housing 140 (nacelle 141), thereby further absorbing heat from the heat sinks 130. The remaining air may pass through the final heat exchanger stage 146. The flow of air is illustrated in FIG. 1 by arrows.

The flow of air through the air duct 170 may be controlled by the fan 180. The fan 180 may also be driven by the electric motor 112. Further, an adjustable gear set (not shown) may be arranged between the fan 180 and the drive shaft of the electric motor 112, such that the rotational direction and speed of the fan 180 is adjustable independently of the rotational speed and direction of the propeller 147. This allows to control the air intake into the air duct (and therefore the pressure inside the air duct). For example, during a takeoff procedure on the runway, the speed of the aircraft and therefore the relative air speed with regard to the aircraft is low. Further, in this situation, the aircraft engine 101 runs under high load, producing an increased amount of heat. In order to account for this, the fan 180 may be controlled to blow additional air into the air duct, to provide enough cooling power. When the aircraft is travelling at high altitude at cruise speed, the engine may run at a lower, constant output. Also, because of the higher speed, the relative air speed is higher. In this situation, the fan 180 may be used to decelerate the intake air speed to the required level (e.g., to approximately 0.1 Mach). Also, the fan 180 may be used to adjust the internal pressure and air speed in the air duct 170 with regard to the surrounding of the aircraft engine 101 such that the venturi effect may be utilized to draw the air through the heat sinks 130.

The heat sinks 130 are built using a functional structural geometry, such as a gyroid structure, as described above. This allows for high mechanical strength while simultaneously providing a large contact area for the air passing through the structure, thereby enabling good heat transfer properties.

By merging the inlet lines 160 and return lines 161 in the described way, and by merging the heat sinks 130 into the wall of the nacelle 141, the weight of the aircraft engine 101 may be greatly reduced while still providing the necessary cooling power for the heat sources 110. Further, utilizing the above-described intended air leakage through the outer wall of the nacelle 141 slows down the air passing through the air duct 170 from the front end 142 to the rear end 143 to a required level for the final heat exchanger stage 146. This allows for a shorter nacelle 141, further contributing to the minimization of weight.

The nacelle 141 may further be built for increased mechanical strength at region where high mechanical loads occur, such as at attachment points. Further, an outer shell 148 (FIG. 3) may allow for structural reinforcement at such regions.

FIG. 1 further indicates a suction area 144 and/or a blowing area 145 at a front end of the nacelle. Such suction and/or blowing areas may be employed for laminar flow control to avoid flow separation from the housing. Such suction/blowing areas 144, 145 may be employed to ensure laminar flow around the housing, as described further above. It should be appreciated that the location of the suction/blowing area 144, 145 as shown in FIG. 1 is only exemplary in nature. Suction areas 144 and/or blowing areas 145 may present at any desired location in order to ensure laminar flow.

Figure 3:
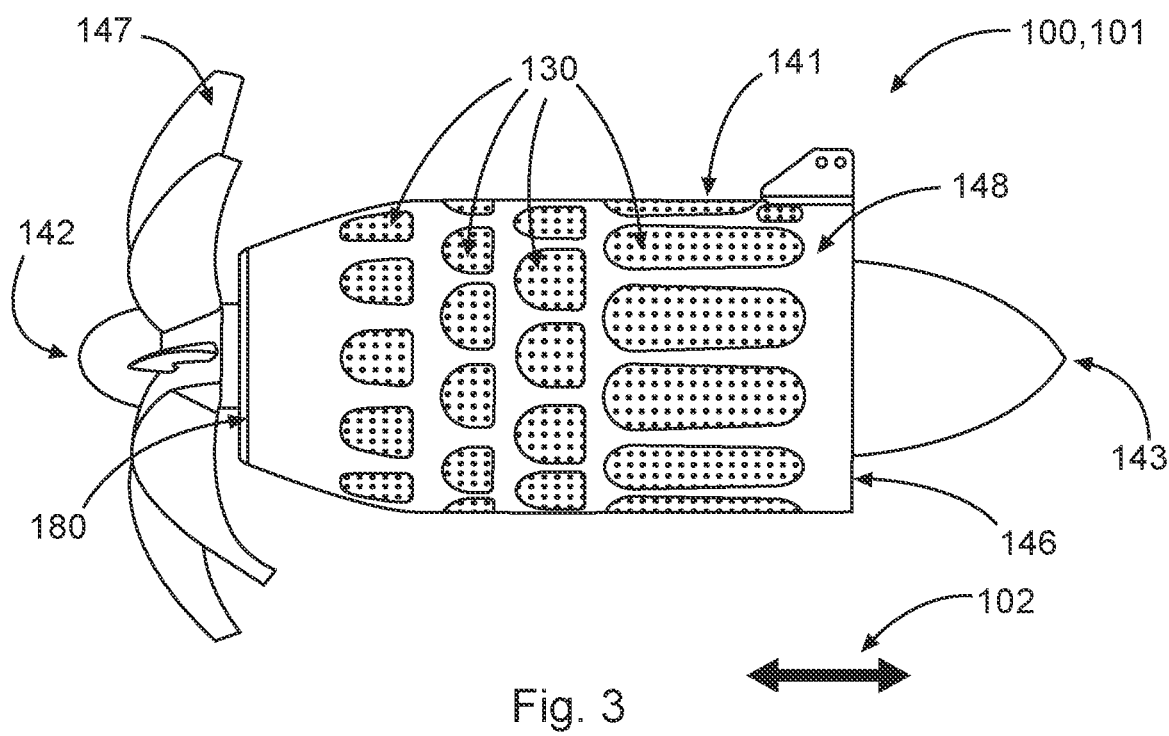
FIG. 3 a schematic outer side view of the aircraft engine of FIGS. 1 and 2.

FIG. 3 shows a schematic outer view of the aircraft engine 101 of FIGS. 1 and 2. In FIG. 3, the outer shell 148 is visible. The outer shell is a discontinuous sheet structure that encloses the outer surface of the nacelle 141, having cutouts at the regions where the heat sinks 130 are arranged. This allows for structural reinforcement, similarly to a honeycomb structure, in order to achieve the required mechanical strength.

Figure 4:
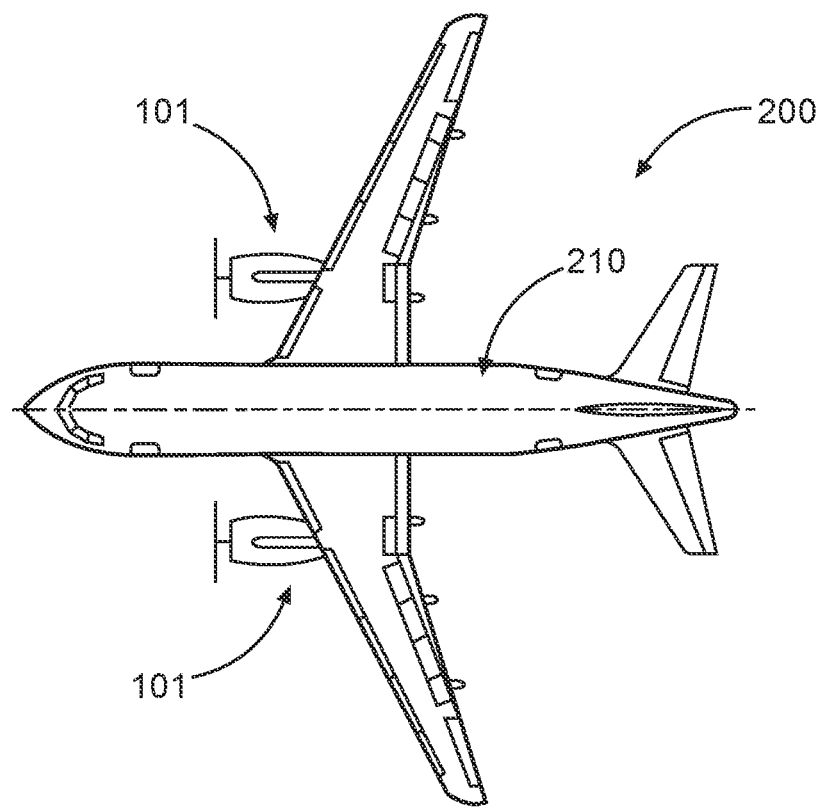
FIG. 4 a schematic view of an aircraft comprising the engine of FIGS. 1 to 3.

FIG. 4 shows an aircraft 200 having a fuselage 210. The aircraft includes two of the electric propeller aircraft engines 101 described with regard to FIGS. 1 to 3. By utilizing the integrated cooling concept of the aircraft engine 101, the overall weight of the aircraft 200 may be reduced. Further, the air flow passing through the wall of the nacelle 141 may be used for de-icing of the surfaces of the nacelle 141 as well as for de-icing of the wings of the aircraft.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

100 component
101 aircraft engine
102 longitudinal direction
110 heat source
111 fuel cell
112 electric motor
113 hydrogen tank
120 heat exchanger
130 heat sink
140 housing
141 nacelle
142 front end
143 rear end
144 suction area
145 blowing area
146 final heat exchanger stage
147 propeller
148 outer shell
150 structural suspension element
160 inlet line
161 return line
170 air duct
180 fan
190 hydrogen tank
200 aircraft
210 fuselage

The invention claimed is:

1. A component for an aircraft, the component comprising:
    at least one heat source;
    a housing enclosing the at least one heat source;
    at least one heat exchanger;
    at least one heat sink;
    at least one structural suspension element; and
    an air duct;

wherein each of the at least one structural suspension element is attached to an inner surface of the housing and supports one or more of the at least one heat source within the housing;

wherein the heat sink is part of the housing and is configured to guide air from an inside of the housing to an outside of the housing to thereby convey thermal energy from the heat sink to surroundings;

wherein each of the at least one heat exchanger is thermally coupled to at least one of the at least one heat source;

wherein each of the at least one heat exchanger is fluidly connected to one of the at least one heat sink via an inlet line for a coolant flowing along one of the at least one structural suspension element;

wherein each of the at least one heat sink is fluidly connected to at least one of the at least one heat exchanger via a return line for the coolant flowing along one of the at least one structural suspension element; and wherein the air duct is configured to guide ambient air from the outside of the housing through the housing, past each of the at least one structural suspension element, and through the at least one heat sink out of the housing, thereby enabling a cooling of the coolant flowing through each of the inlet line and the return line and through each of the at least one heat sink.

2. The component of claim 1, wherein the at least one heat source is a fuel cell or an electric motor or an arrangement of one or more electric motors and one or more fuel cells.

3. The component of claim 1, further comprising a fan, wherein the fan is in an opening of the housing; and
   wherein the fan is configured to control air flow from the outside of the housing into the air duct.

4. The component of claim 3, wherein the fan is configured to be controlled to control an air flow into the housing such that a pressure difference between the inside of the housing and the outside of the housing is established that supports removal of the air from the inside of the housing through the heat sink utilizing a venturi effect.

5. The component of claim 1, wherein the heat sink comprises a functional cellular geometry.

6. The component of claim 5, wherein the functional cellular geometry comprises a gyroid structure.

7. The component of claim 1, wherein the housing further comprises at least one suction area and/or at least one blowing area for laminar flow control to avoid flow separation from the outside of the housing.

8. The component of claim 1, wherein the component is a control surface of an aircraft.

9. The component of claim 8, wherein the control surface of the aircraft is one of an elevator, a rudder, and a wing.

10. The component of claim 1, wherein the component is an aircraft engine and wherein the housing is a nacelle of the aircraft engine.

11. The component of claim 10, wherein the aircraft engine is an electric propeller engine comprising an electric motor, at least one hydrogen fuel cell and at least one hydrogen tank;
    wherein the electric motor is powered by the at least one fuel cell;
    wherein the electric motor and/or the at least one fuel cell each are one of the at least one heat source.

12. The component of claim 10, wherein the air duct runs from a front end of the nacelle to a rear end of the nacelle.

13. The component of claim 10, wherein the housing further includes a final heat exchanger stage at the rear end.

14. The component of claim 1, wherein the heat sink further is configured for de-icing of the housing.

15. An aircraft, comprising:
    a fuselage; and
    at least one component according to claim 1.

* * * * *